(12) United States Patent
Abbing

(10) Patent No.: US 10,801,736 B2
(45) Date of Patent: Oct. 13, 2020

(54) LIQUID DISTRIBUTION UNIT

(71) Applicant: 3EFLOW AB, Luleå (SE)

(72) Inventor: Erik Abbing, Luleå (SE)

(73) Assignee: 3EFLOW AB, Lulea (SE)

( * ) Notice: Subject to any disclaimer, the term of this patent is extended or adjusted under 35 U.S.C. 154(b) by 295 days.

(21) Appl. No.: 15/738,288

(22) PCT Filed: Jun. 27, 2016

(86) PCT No.: PCT/EP2016/064857
§ 371 (c)(1),
(2) Date: Dec. 20, 2017

(87) PCT Pub. No.: WO2017/001341
PCT Pub. Date: Jan. 5, 2017

(65) Prior Publication Data
US 2018/0180298 A1 Jun. 28, 2018

(30) Foreign Application Priority Data

Jul. 2, 2015 (SE) ...................... 1550942

(51) Int. Cl.
*F24D 17/00* (2006.01)
*E03B 7/04* (2006.01)
(Continued)

(52) U.S. Cl.
CPC .............. *F24D 17/001* (2013.01); *E03B 7/04* (2013.01); *E03B 7/045* (2013.01); *E03B 7/075* (2013.01);
(Continued)

(58) Field of Classification Search
CPC ..... Y02B 30/18; F24D 19/083; F24D 17/001; F24D 19/088; F24D 17/0078; E03B 7/08; E03B 7/075; E03B 7/045; E03B 7/04
See application file for complete search history.

(56) References Cited

U.S. PATENT DOCUMENTS 3,872,011 A * 3/1975 Teranishi ........... B01D 19/0068
  210/269
3,873,004 A * 3/1975 Feild ....................... B08B 3/026
  222/135

(Continued)

FOREIGN PATENT DOCUMENTS

DE   4406150 A1   9/1995
EP   2503252   *   9/2012
(Continued)

OTHER PUBLICATIONS

International Search Report and Written Opinion from corresponding International Application No. PCT/EP2016/064857, dated Sep. 22, 2016.
(Continued)

*Primary Examiner* — Steven S Anderson, II
(74) *Attorney, Agent, or Firm* — Tucker Ellis LLP

(57) ABSTRACT

A liquid distribution unit, for use in a liquid distribution system designed for saving liquid and thermal energy. It comprises and inlet manifold (FL) with a number of branch connections (CI, C2) for connection, in use, with associated feeding conduits (FC1, FC2) and liquid tap units. The inlet manifold device has an inlet end (IE) for joint connection, in use, with a liquid source (LS). Each branch connection has an associated control valve (CV1, CV2) for selective communication, in use, between the liquid source and an associated one of the feeding conduits. Each branch connection is also provided with an additional branch connection located downstream in relation to the associated control valve, as seen when the liquid is refilled into the feeding conduit, and having an associated, separate liquid evacuation valve (EV1, EV2) and an outlet end (OE1, OE2). The outlet ends of the additional branch connections are jointly connectable to an evacuation liquid pump (EP).

14 Claims, 3 Drawing Sheets

(51) Int. Cl.
*E03B 7/07* (2006.01)
*E03B 7/08* (2006.01)
*F24D 19/08* (2006.01)

(52) U.S. Cl.
CPC ............ *E03B 7/08* (2013.01); *F24D 17/0078* (2013.01); *F24D 19/083* (2013.01); *F24D 19/088* (2013.01); *Y02B 30/18* (2013.01)

(56) References Cited

U.S. PATENT DOCUMENTS

| | | | |
|---|---|---|---|
| 4,570,449 A * | 2/1986 | Knokey | F24D 17/02 62/183 |
| 5,775,372 A | 7/1998 | Houlihan | |
| 6,039,067 A * | 3/2000 | Houlihan | E03B 7/04 137/337 |
| 2008/0006227 A1* | 1/2008 | Ziehm | F24D 17/0078 122/19.1 |
| 2009/0026281 A1* | 1/2009 | McGreevy | F24D 17/0005 237/19 |
| 2012/0211085 A1* | 8/2012 | Abbing | E03B 7/04 137/1 |

FOREIGN PATENT DOCUMENTS

| | | |
|---|---|---|
| JP | 2006010172 A | 1/2006 |
| WO | 2010103521 A2 | 9/2010 |
| WO | 2011053237 A1 | 5/2011 |
| WO | 2012075592 A1 | 6/2012 |
| WO | 2012148351 A1 | 11/2012 |

OTHER PUBLICATIONS

International Preliminary Report on Patentability from corresponding International Application No. PCT/EP2016/064857, dated Jun. 22, 2017.

* cited by examiner

LIQUID DISTRIBUTION UNIT

FIELD OF THE INVENTION

The present invention relates to a liquid distribution unit, for use in a liquid distribution system designed for saving liquid and thermal energy, the liquid distribution unit comprising an inlet manifold device with a number of branch connections for connection, in use, with associated feeding conduits and liquid tap units in said liquid distribution system, said inlet manifold device having an inlet end for joint connection, in use, with a liquid source in said liquid distribution system, each of said branch connections having a control valve for selective communication, in use, between said liquid source and an associated one of said feeding conduits.

Such systems are used primarily for distributing hot water in buildings, but the principles applied in the invention may very well be implemented also for other liquids, and also for distributing cold liquids.

BACKGROUND OF THE INVENTION AND PRIOR ART

A system has been developed, and is the subject of a patent application ("A method and liquid distribution system for saving liquid and thermal energy") being filed on the same day as the present application, where a number of feeding conduits are connected to a central liquid source, these feeding conduits communicating at their far ends with associated liquid tap units, e.g. for tapping hot water. In order to enable a distinct opening and closing of these liquid tap units, there is provided a dampening valve device adjacent to each liquid tap unit.

As is known per se from Applicant's earlier international (PCT) patent application WO2012/148351, the system operates in cycles, each comprising the following steps:

evacuating the liquid from the associated feeding conduit after completion of a tapping operation at the associated liquid tap unit, by generating a backward pressure gradient in the associated feeding conduit, so that the liquid flows backwards towards the liquid source and the associated feeding conduit thereafter contains only air or gas being retained therein, and refilling, upon activating said liquid tap unit, the associated feeding conduit with liquid by generating a forward pressure gradient in the associated feeding conduit and permitting liquid to flow from the liquid source to the associated liquid tap unit, while pushing the remaining air or gas in the feeding conduit towards the associated liquid tap unit at an operating pressure exceeding an ambient air pressure level.

In the prior art system, as disclosed in the above-mentioned PCT application, each feeding conduit is connected to the liquid source by means of a single control valve, which is located at the branch connection of an inlet manifold device and can be open or closed. When it is open, the liquid source will feed liquid into the associated feeding conduit as long as the liquid tap unit signals that the flow of hot water should be maintained. When a tap unit is being closed or deactivated, a signal is given so as to activate a centrally located pump which pumps back the liquid from the feeding conduit via the open control valve back to the liquid source. The same pump is used for circulating hot water in the liquid source and for pumping back liquid from the feeding conduits. When a feeding conduit is completely evacuated, which is sensed by a level sensor, the control valve is closed again, so that the feeding conduit is retained at a relatively low pressure, slightly below the ambient air pressure, with only gas or air therein. Moreover, in the prior art system, ambient air or gas will replace the liquid when it is evacuated from the feeding conduits. For this purpose, there is a special air valve adjacent to the liquid valve between the feeding conduit and the associated tap unit.

OBJECT OF THE INVENTION

Against this background, the object of the invention is to improve the structure and the function of the liquid distribution unit, so that a particular feeding conduit can be evacuated directly when there is an indication that the associated tap unit is being closed. Also, it should be possible to evacuate and refill the various feeding conduits independently of each other, so that at least one of them can be evacuated while at least one other feeding conduit is being refilled (when the associated tap unit has been activated). Furthermore, even if the evacuation of the various feeding conduits is done independently, it should be sufficient to use a single pump for such evacuation of all the feeding conduits. Such pumps, having the capacity to reduce the pressure down to a lowermost pressure level of about 20-80% of the ambient air pressure, are relatively expensive. Finally, the structure of such a unit should be compact, so that the whole unit can be fitted into a limited space as a central apparatus.

SUMMARY OF THE INVENTION

The objects stated above are achieved for a liquid distribution unit wherein each of a number of branch connections, at an inlet manifold device, is also provided with an additional branch connection, located downstream in relation to the associated control valve (as seen when the feeding conduit is refilled with liquid) and having an associated, separate evacuation valve and an outlet end, and the outlet ends of the additional branch connections are jointly connectable, in use, to a single evacuation liquid pump capable of reducing the pressure down to a pressure which is substantially below the ambient air pressure.

In principle, the evacuated liquid being pumped out from the feeding conduits via the additional branch connection and the separate evacuation valve could be stored separately in a heat insulated container. However, according to the invention the evacuation pump is connected, at its outlet end, to the liquid source, so that the liquid is recirculated back to the liquid source. In this way, the thermal energy can be saved in an optimum way.

The liquid distribution unit according to the invention has a number of advantages:

the feeding conduits can be evacuated and refilled independently of each other, thanks to the separate evacuation valves, only one evacuation pump is needed, the unit is compact and requires very little space, the unit is easy to install, since it is easy to understand where all the connections are to be connected to the rest of the system (feeding conduits, liquid source, evacuation pump and electrical cables).

Further features of the liquid distribution unit will appear from the detailed description below, where a preferred embodiment of the invention is disclosed.

BRIEF DESCRIPTION OF THE DRAWINGS

The invention will now be explained further below, with reference to the appended drawings which illustrate a preferred embodiment of the liquid distribution unit according to the invention.

DETAILED DESCRIPTION OF A PREFERRED EMBODIMENT OF THE INVENTION

Figure 1:
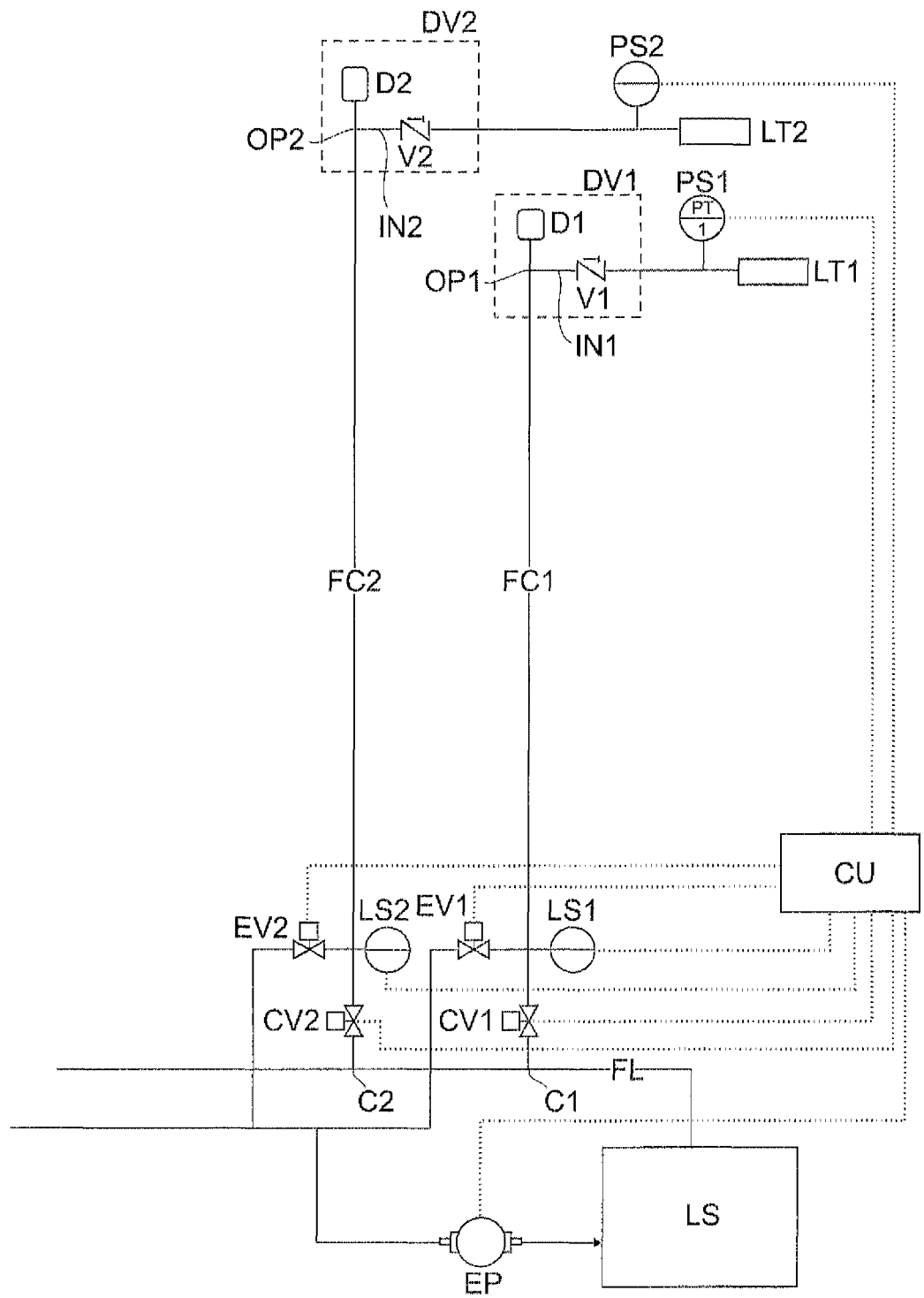
FIG. 1 illustrates, in a schematic diagram, a liquid distribution system which comprises a number of components, among them a liquid distribution unit according to the invention (down to the left)

In FIG. 1, there is shown, in a schematic diagram, a liquid distribution system designed for saving liquid and thermal energy. A separate patent application, disclosing the system as a whole, is being filed at the same time as the present application.

A central liquid source LS, possibly including a hot water tank and a circulating loop of hot water, is connected to a number of hot water feeding conduits FC1, FC2, etc. via a feed line FL, separate connections C1, C2, etc. and individual control valves CV1, CV2, etc. When a control valve CV1, etc. is opened, hot water will flow into the associated feeding conduit FC1, FC2, etc. which has been evacuated in a previous evacuation step.

There will be a high pressure gradient in the particular feeding conduit FC1, etc. since the control valve CV1, etc. is open and thus conveys a driving pressure from below, corresponding to the pressure prevailing in the liquid source LS (typically about 2 to 5 bars overpressure or, in absolute terms, more than 300% of the ambient air pressure), and an upper very low pressure, such as 0.2 to 0.8 bar underpressure or, in absolute terms, about 20 to 80% of the ambient air pressure. Accordingly, the hot water will flow at a high velocity towards a liquid tap unit LT1, etc. Normally the feeding conduits are at least 5 to 30 m long, from the liquid source LS to the respective hot water tap unit LT1, etc. within a building.

When the hot water approaches the liquid tap unit, there is a risk for a hard striking impulse, a so called "water hammer", of the hot water. However, as is known per se, from the above-mentioned PCT application WO 2012/1408351, a dampening chamber D1, etc. is arranged in the vicinity of a liquid valve V1, etc. so that an air or gas cushion will dampen the impact of the rapidly moving hot water.

Each dampening chamber D1, etc. is connected to the far end of the associated feeding conduit FC1, FC2, etc. via a passage OP1, OP2, etc., and in this passage, there is an inlet to a non-return valve or check valve V1, V2, etc. leading at its outlet end to an associated one of the liquid tap units LT1, etc.

The structure of the dampening valve unit DV1, DV2, etc., formed by the dampening chamber D1, the passage OP1, OP2, etc. and the liquid valve V1, V2, etc., is disclosed in detail in two further patent applications ("a dampening valve unit" and "a fluid stop valve unit") being filed on the same day as the present application. Thus, the non-return valve unit may comprise at least one, preferably two check-valves connected in series, being biased towards a closing position by a non-linear spring device, so that the valve will shift from a closing position to an open position when a threshold pressure level is present at the inlet IN1, IN2, etc. of the valve (or upon detecting that water is present at the inlet of the valve). The non-linear spring device is coupled to the non-return valve or valves and is designed in such a way that, when the threshold pressure is reached, the valve body will move suddenly a relatively long way into its opening position (to the right in FIG. 3). So, the valve will open distinctly and permit a high flow of hot water immediately after the threshold pressure level has been reached.

As described in the separate patent application "a dampening valve unit", the dampening chamber D1, D2, etc. can be housed in a separate casing or it can be formed by a housing where the valve V1 is located centrally (not shown), or in some other way. In either case, the upper end of the feeding conduit FC1, FC2, etc. adjoins the above-mentioned passage OP1, OP2, etc., which also accommodates the inlet IN1, IN2, etc. of the valve V1, V2, etc.

The prevailing pressures and the volumes of the feeding conduits FC1, FC2, etc. are such that the pressure of the refilling water is still relatively low when it reaches the passage OP1, OP2, etc., below the set threshold pressure of the valve. Therefore, the water will move further upwards, beyond the passage OP1, OP2, etc. before the air or gas, being trapped in the adjoining dampening chamber D1, D2, etc., is compressed to such a degree that the air or gas pressure, causing a corresponding pressure in the water adjacent thereto, rises to a level corresponding to the threshold level of the valve V1, V2, etc. Then, the valve suddenly opens, and the hot water will flow through the valve into the adjoining liquid tap unit LT1, LT2, etc. Since there is now only water in the passage OP1, OP2, etc., only water, and no gas or air, will flow through the valve and into the liquid tap LT1, LT2, etc. The pressure in the liquid source LS, being much higher than the ambient air pressure (even at the liquid tap unit LT1, LT2, etc.) and the threshold pressure (typically 25% to 75% of the pressure prevailing in the liquid source) of the liquid valve V1, V2, etc. will ensure that the air or gas compressed in the dampening chamber D1, D2, etc. will stay compressed and not expand into the passage OP1, OP2, etc. during normal operation of the liquid distribution system. Such prevailing pressures and threshold pressure of the liquid valve will also make it possible to have a dampening chamber with a relatively small volume.

One way to retain the air or gas within the dampening chamber D1, D2, etc. is to arrange, in parallel, a gas inlet valve as well as a gas outlet valve in the passage OP1, OP2, etc. between the feeding conduit and the dampening chamber.

Only when a tap handle, or a corresponding device or sensor, is activated for closing the particular liquid tap unit LT1, LT2, etc. will there be a change. Then, a pressure sensor PS1, PS2, etc., being inserted between the valve V1, V2, etc. and the associated liquid tap unit LT1, LT2, will sense an increased pressure (the flow is stopped but the feeding pressure is still present) and send an electric signal to a control unit CU which will in turn close the control valve CV1, CV2, etc. adjacent to the liquid source LS. Also, the control unit CU will send a signal to a separate liquid evacuation valve EV1, EV2, etc. so as to open the latter. Thereupon, the hot water remaining in the associated feeding conduit FC1, etc. will be evacuated via the valve EV1, and the complete removal of hot water from the feeding conduit will be detected by an associated level sensor LS1, LS2 etc. which is mounted next to the additional branch connection AC1, AC2, etc. at the downstream side thereof (as seen when the liquid is refilled from the liquid source LS).

Figure 2:
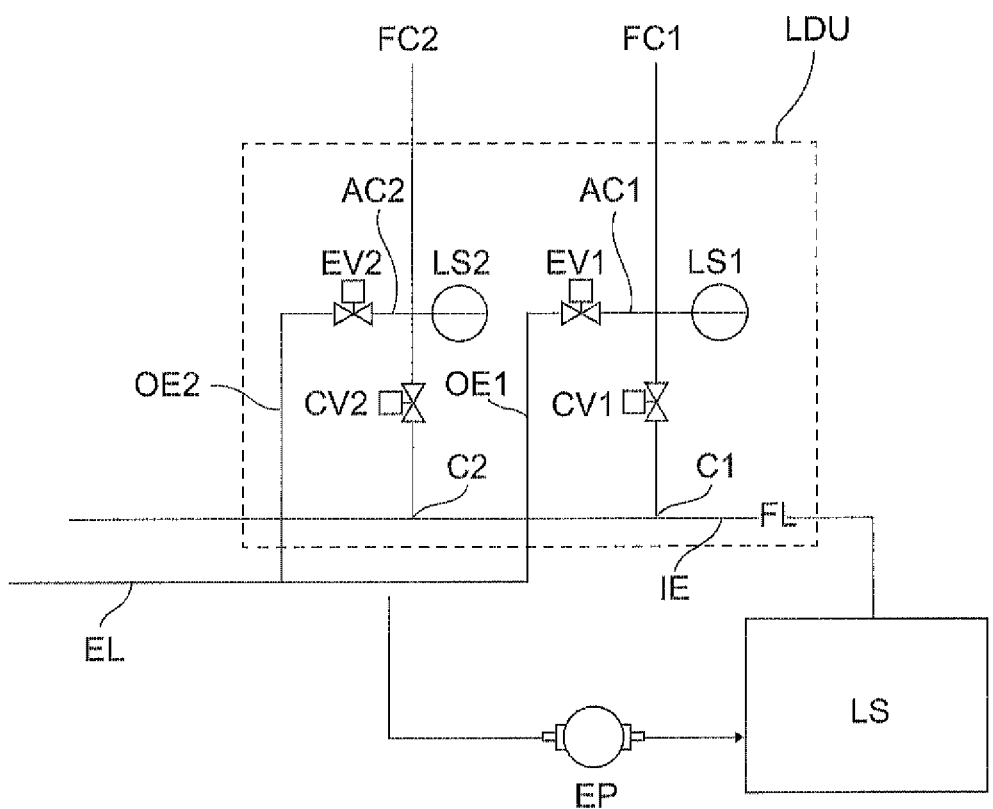
FIG. 2 shows, at a larger scale, a part of the system constituting the liquid distribution unit, within a rectangle drawn with dashed lines, in the form of a module with connections to two feeding conduits.
Figure 3:
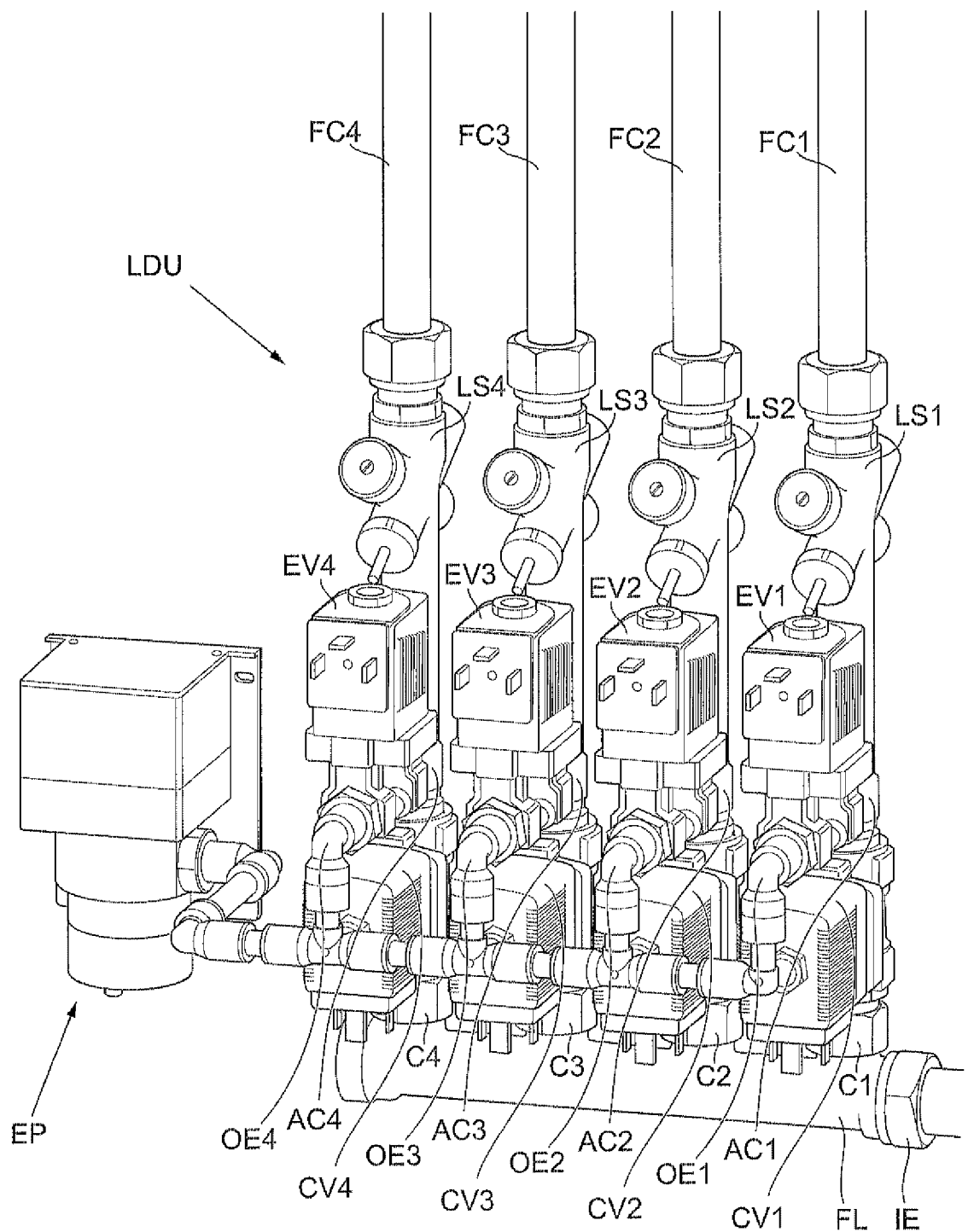
FIG. 3 shows, in a perspective view, an example of a liquid distribution unit with connections, valves and sensors in two modules as shown in FIG. 2, and an evacuation pump which is jointly connected to the outlets of all the evacuation valves.

These liquid evacuation valves EV1, EV2, etc., together with the above-mentioned control valves CV1, CV2, etc. are arranged in a separate unit, denoted a "liquid distribution unit" LDU, shown more clearly in FIG. 2 (a schematic diagram) and FIG. 3 (a perspective view of the physical components), the latter showing two modules each comprising the components associated with two feeding conduits.

The unit LDU is composed of a number of modules, one being shown in FIG. 2, and two modules being shown in FIG. 3.

The feed line FL from the liquid source LS (at the very bottom of FIG. 3) constitutes an inlet manifold device for the unit LDU and comprises an inlet end IE and a number of branch connections C1, C2, etc., each one for connection, in use, with an associated feeding conduit FC1, FC2, etc. and, consequently, with the associated liquid tap units LT1, LT2, etc. (FIG. 1). These branch connections C1, C2, etc. are each fitted to (connected to) an associated control valve CV1, CV2, etc. (mentioned above) for opening or closing the passage of liquid from the liquid source LS to the feeding conduit F1, F2, etc. Adjacent to the control valve CV1, CV2, etc., the associated feeding conduit FC1, FC2, etc. is also provided with an additional branch connection AC1, AC2, etc. (mentioned above), located downstream (as seen during refilling the feeding conduit with liquid) and immediately adjacent to the associated control valve CV1, CV2, etc. This additional branch connection AC1, AC2, etc. leads to an associated, separate evacuation valve EV1, EV2, etc., each with an outlet end OE1, OE2, etc.

The outlet ends OE1, OE2, etc. of the separate evacuation valves EV1, EV2, etc. are jointly connected to an evacuation pump EP which will recirculate the hot water to the liquid source LS. Although FIG. 3 shows separate connections, in series, to the inlet side of the evacuation pump EP, it is of course possible to use a manifold outlet pipe or device for this purpose, similar to the inlet manifold pipe or device constituted by the feeding line FL. In FIG. 2, such an outlet manifold device is denoted EL (to the left in FIG. 2).

The liquid distribution unit LDU comprises the inlet manifold device FL, the branch connections C!, C2, etc., the control valves CV1, CV2, etc., the level sensors LS1, LS2, etc., the additional branch connections AC1, AC2, etc., the separate evacuation valves EV1, EV2, etc., and the outlet ends OE1, OE2, etc. which are connectable, possibly via an outlet manifold device EL, to an evacuation liquid pump EP. The unit operates as follows:

Initially, upon connecting the unit LDU to a liquid source LS, a number of feeding conduits FC1, FC2, etc., an electronic control unit CU and an evacuation pump EP (FIG. 1), there is air or gas in most of the system. At first, one or more of the control valves CV1, etc. are opened (the evacuation valves are closed at this point of time), whereupon hot water will flow from the liquid source until they fill up the particular feeding conduits FC1, FC2, etc.

When the hot water approaches the associated dampening valve unit DV1, etc. the pressure will rise sharply in the feeding conduit, so that the associated valve V1 opens and will let the hot water flow into the corresponding liquid tap unit LT1, etc. During the first cycles, there may be some air that flows out through the valve V1, etc. but after a number of operating cycles, the amount of air will be adjusted so that the hot water will pass by the passage OP1, etc. before the valve V1, etc. opens, so the remaining air will then be compressed in the dampening chamber only. Thus, at this point, no air will escape through the valve V1, etc.

Hot water will flow via the feeding conduits FC1 etc. and the valve V1 etc. to the liquid tap unit LT1 etc. until a tap handle is closed, or some other device sends a signal to close the control valve CV1, etc. Thereupon, the associated, separate evacuation valve EV1, EV2, etc. is opened, so that the evacuation pump EP will be coupled to the associated feeding conduit and the hot water therein will be pumped out and be recirculated into the liquid source IS. This will continue as long as there is any liquid left in the feeding conduit. Then, the associated level sensor LS1, etc. will detect that the feeding conduit has been totally evacuated, and the associated, separate evacuation valve EV1, etc. will be closed. At this time, the pressure of the remaining air in the liquid conduit FC1 is very low, typically about 0.2 to 0.8 bar. All the hot water has been pumped back to the liquid source LS, and there is no hot water left in this particular feeding conduit. Accordingly, there will be no leakage of heat energy from the feeding conduit as long as it is kept empty.

The units LDU, or rather one or more modules (FIG. 2), are preferably assembled at a manufacturing plant and will be easy to connect on site in a building (or other facility).

Those skilled in the art can modify the above-described liquid distribution unit LDU within the scope of the appended claims. For example, the level sensors LS1, etc. may be replaced by pressure sensors for the detection of the evacuation of each particular feeding conduit.

Also, an evacuation pump EP may be included as an integrated part of the unit. Likewise, the electronic control unit CU may be an associated part of the unit LDU.

The invention claimed is:

1. A liquid distribution system, provided with a liquid distribution unit and having two or more feeding conduits connected to a central liquid source and each being connected at its far end with an associated liquid tap unit, the liquid distribution unit enabling a selective feeding of liquid from said central liquid source to a desired number of the liquid tap units, said liquid distribution unit comprising:

an inlet manifold device having an inlet end connected to said central liquid source and an outlet end with at least two branch connections;

a feeding pipe connection extending from each of the at least two branch connections;

a control valve in each said feeding pipe connection, each control valve being open when feeding liquid from said central liquid source to an associated liquid tap unit;

a junction at a downstream end of each said control valve, said junction being connected to a respective one of said two or more feeding conduits;

said junction also being connected to an additional branch connection adjoining to a respective evacuation valve, each said evacuation valve being open or closed when the associated control valve is closed, and each said evacuation valve being closed when the associated control valve is open, wherein each said evacuation valve communicates with a branch outlet, each said branch outlet is connected to an outlet manifold device, said outlet manifold device has a single outlet being connected to an evacuation liquid pump, and said evacuation liquid pump has an outlet that is connected to said central liquid source for recirculating liquid backwards from at least one of said two or more feeding conduits after completion of a tapping operation in at least one associated liquid tap unit.

2. The liquid distribution system defined in claim 1, wherein said control valves and said associated evacuating valves are operable in such a way that at least one of said feeding conduits is connected via an associated control valve to said central liquid source, while at least one other feeding conduit is simultaneously connected, via an associated evacuating valve to said evacuation liquid pump.

3. The liquid distribution system defined in claim 2, wherein said control valves and said associated evacuation valves are also operable in such a way that at least one of said feeding conduits is disconnected from said central liquid source as well as from said evacuation liquid pump.

4. The liquid distribution system defined in claim 1, wherein the inlet manifold device and the outlet manifold device are elongated and mutually parallel so as to form a module together with said control valves and said evacuation valves.

5. The liquid distribution system defined in claim 1, wherein said control valves and said associated evacuation valves are electromagnetic valves configured to be connected to an electronic control unit liquid distribution system.

6. The liquid distribution system defined in claim 5, wherein each of said evacuation valve is adapted to become activated via said electronic control unit.

7. The liquid distribution system defined in claim 5, wherein said electronic control unit forms a part of the liquid distribution unit and wherein said electronic control unit is also connected to a level sensor in said feeding conduit adjacent to said associated feeding pipe connection, said level sensor also forming a part of the liquid distribution unit.

8. The liquid distribution system defined in claim 1, wherein each said feeding conduit is connected via a non-return valve to said liquid tap unit, and
wherein said central liquid source is operative to provide a driving pressure of 2 to 5 bars overpressure in relation to an ambient air pressure prevailing outside said liquid distribution system, when the associated control valve is open, at the downstream side of said control valve and in each associated feeding conduit.

9. The liquid distribution system defined in claim 1, wherein said feeding conduits are 5 to 30 m long, measured from said associated control valve to said liquid tap unit.

10. The liquid distribution system defined in claim 1, comprising at least one module including:
a part of said inlet manifold device,
at least two of said branch connections,
at least two of said feeding pipe connections,
at least two of said additional branch connections,
at least two of said associated evacuation valves, and
at least one of said branch outlets being connected via said outlet manifold device to said evacuation liquid pump.

11. The liquid distribution system defined in claim 1, wherein said evacuation liquid pump is adapted to reduce the pressure, during the backwards recirculation of liquid after a tapping operation, down to a lowermost pressure level of 20-80% of an ambient air pressure prevailing outside the liquid distribution system.

12. A liquid distribution unit for selective feeding of liquid from a central liquid source to a desired number of liquid tap units, the liquid distribution unit comprising:
an inlet manifold device having an inlet end configured to connect to the central liquid source and an outlet end with at least two branch connections;
a feeding pipe connection extending from each of the at least two branch connections;
a control valve in each of the feeding pipe connections, each control valve configured to be open when feeding liquid from the central liquid source to an associated liquid tap unit; and
a junction at a downstream end of each of the control valves, each junction configured to be connected to a feeding conduit and to an additional branch connection adjoining to a respective evacuation valve,
wherein each evacuation valve is open or closed when the associated control valve is closed, and each evacuation valve is closed when the associated control valve is open,
wherein each evacuation valve communicates with a branch outlet that is connected to an outlet manifold device having a single outlet being connected to an evacuation liquid pump, and
wherein the evacuation liquid pump has an outlet that is configured to be connected to the central liquid source for recirculating liquid backwards from at least one of the feeding conduits after completion of a tapping operation in at least one associated liquid tap unit.

13. The liquid distribution system defined in claim 1, further comprising an electronic control unit that forms a part of the liquid distribution system and is configured to control operation of the liquid distribution unit.

14. The liquid distribution system defined in claim 13, wherein the electronic control unit forms a part of the liquid distribution unit.

\* \* \* \* \*